Figure 1:
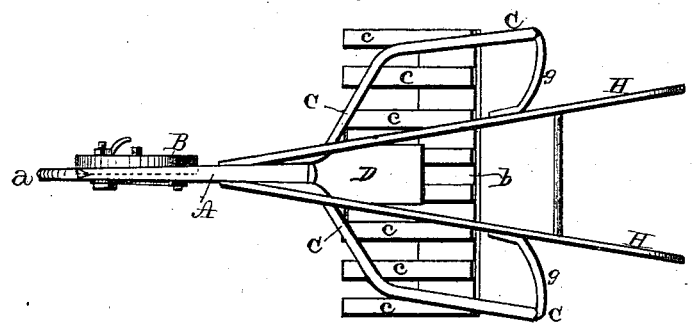
Figure 2:
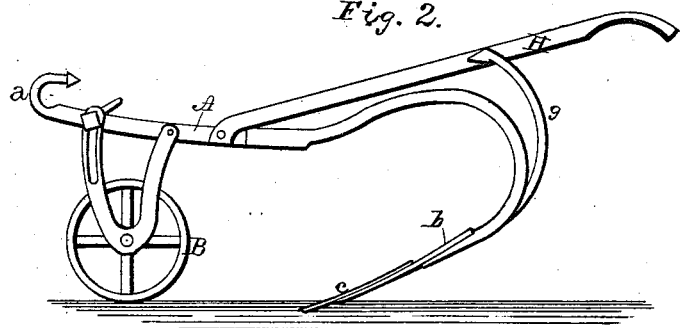
Figure 3:
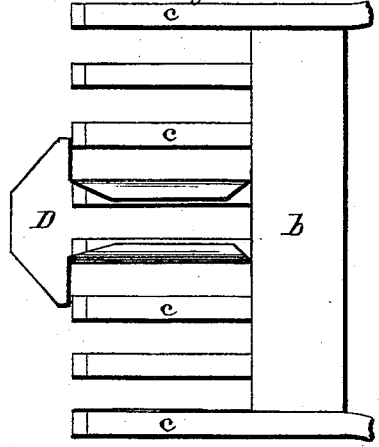

D. BOTSFORD.
Potato-Digger

No. 167,296.　　　　　　　　　　　　Patented Aug. 31, 1875.

WITNESSES.
Wm Garner
Wm Kupperman

INVENTOR.
David Botsford
per
F. A. Lehmann
atty.

UNITED STATES PATENT OFFICE.

DAVID BOTSFORD, OF WARSAW, NEW YORK, ASSIGNOR OF ONE-HALF HIS RIGHT TO FRANK CAULKINGS, OF SAME PLACE.

IMPROVEMENT IN POTATO-DIGGERS.

Specification forming part of Letters Patent No. 167,296, dated August 31, 1875; application filed July 1, 1875.

*To all whom it may concern:*

Be it known that I, DAVID BOTSFORD, of Warsaw, in the county of Wyoming and State of New York, have invented certain new and useful Improvements in Potato-Diggers; and I do hereby declare the following to be a full, clear, and exact description of the invention, such as will enable others skilled in the art to which it pertains to make and use it, reference being had to the accompanying drawings, which form part of this specification.

My invention relates to an improvement in potato-diggers; and it consists in an arrangement and combination of parts that will be more fully described hereinafter.

The accompanying drawings represent my invention.

A represents a beam slightly curved upward, and provided with a hook, $a$, at its forward end, for the attachment of power. To the side of the beam A is pivoted an adjustable wheel, B, for the support of the beam, and to its rear end are firmly secured the bent rods C, which are bent sidewise from the beam, and curved first back and downward, and then forward at a proper distance apart to have the broad flat bar $b$ secured to their ends. The angle which this bar $b$ forms with the ground is determined by the adjustment of the wheel B, and may be increased to thirty-five or forty degrees, if desired. To the upper side of the bar $b$ are rigidly attached, with suitable intervals, the teeth $c$, which extend from the rear edge of the said bar forward to a considerable distance, and have a shoulder underneath abutting against the forward edge of the teeth $c$, and is made even with the said bar. The front edges of the teeth are sharpened, and slightly turned upward. A sharp steel-pointed shovel, D, is placed upon the two central teeth, and projects forward beyond their front ends. The part of the shovel D which is placed upon, and held by, the teeth is in the form of a sleeve, its sides being bent downward and under the teeth, the bend beginning at the point of the teeth, and its rear end resting against the front edge of the bar $b$.

The shovel may be removed, or exchanged for any purpose without loss of time whenever desired by simply drawing it off from the two central teeth, or pushing it onto them.

The shovel is made of steel plate, and shaped to run easily in the ground and under the potatoes, whereby they are lifted from their bed and thrown with the earth upon the teeth $c$, where they are separated from the dirt, and then passed off behind and left lying on the top of the ground.

To the beam A are attached the handles H, which handles are supported by the braces $g$, secured to the rods C, and are of any desired form, extending backward far enough to give the necessary leverage to guide and control the digger with ease.

Having thus described my invention, I claim—

In a potato-digger, the combination of the teeth $c$ and bar $b$ with the removable shovel D, having its sides turned over so as to form a sleeve to fit the teeth, substantially as shown and described.

In testimony that I claim the foregoing I have hereunto set my hand this 1st day of June, 1875.

DAVID BOTSFORD.

Witnesses:
EDWARD M. JENNINGS,
MAURICE R. QUACKENBUSH.